US008353044B1

(12) United States Patent
Jones et al.

(10) Patent No.: US 8,353,044 B1
(45) Date of Patent: Jan. 8, 2013

(54) METHODS AND SYSTEMS FOR COMPUTING DEVICE REMEDIATION

(75) Inventors: Howard Jones, Provo, UT (US); Kevin Unbedacht, Orem, UT (US); Randall R. Cook, Springville, UT (US)

(73) Assignee: Symantec Corporation, Mountain View, CA (US)

(*) Notice: Subject to any disclaimer, the term of this patent is extended or adjusted under 35 U.S.C. 154(b) by 1092 days.

(21) Appl. No.: 12/147,744

(22) Filed: Jun. 27, 2008

(51) Int. Cl.
*H04L 29/06* (2006.01)

(52) U.S. Cl. .................................. 726/25; 726/1; 718/1

(58) Field of Classification Search ................ 726/1, 25; 718/1
See application file for complete search history.

(56) References Cited

U.S. PATENT DOCUMENTS

| 7,117,495 | B2 | 10/2006 | Blaser et al. |
| 7,162,724 | B2 | 1/2007 | Blaser et al. |
| 7,165,260 | B2 | 1/2007 | Blaser et al. |
| 7,461,086 | B1 | 12/2008 | Hurren et al. |
| 7,461,096 | B1 | 12/2008 | Hurren et al. |
| 7,512,977 | B2 | 3/2009 | Cook et al. |
| 7,519,963 | B1 | 4/2009 | Blaser et al. |
| 7,542,988 | B1 | 6/2009 | Cook et al. |
| 7,549,164 | B2 | 6/2009 | Cook et al. |
| 7,620,956 | B2 | 11/2009 | Cook et al. |
| 7,877,413 | B1 | 1/2011 | Cook et al. |
| 7,886,291 | B1 | 2/2011 | Jones et al. |
| 7,945,897 | B1 | 5/2011 | Cook |
| 7,970,789 | B1 | 6/2011 | Blaser et al. |
| 8,010,961 | B1 | 8/2011 | Cook et al. |
| 8,112,767 | B1 | 2/2012 | Cook |
| 2003/0177389 | A1* | 9/2003 | Albert et al. .............. 713/201 |
| 2006/0036570 | A1* | 2/2006 | Schaefer et al. .............. 707/1 |
| 2006/0075140 | A1* | 4/2006 | Sobel et al. .............. 709/245 |
| 2006/0179476 | A1* | 8/2006 | Challener et al. .............. 726/4 |
| 2008/0281884 | A1* | 11/2008 | Subrahmanyam .......... 707/205 |
| 2009/0089815 | A1* | 4/2009 | Manczak et al. .............. 719/327 |
| 2009/0094673 | A1* | 4/2009 | Seguin et al. .............. 726/1 |

OTHER PUBLICATIONS

Jansen et. al. "Policy Enforcement and Compliance Proofs for Xen Virtual Machines" Mar. 7, 2008, VEE '08 Proceedings of the fourth ACM SIGPLAN/SIGOPS international conference on Virtual execution environments, pp. 101-110.*
Jared Blaser; Process Tracking Application Layered System; U.S. Appl. No. 11/324,571, filed Jan. 3, 2006.
Jeremy Hurren; Feature Based Software Virtualization; U.S. Appl. No. 11/960,706, filed Dec. 20, 2007.
Randall Cook; Automatic Virtualization Based on User-Defined Criteria; U.S. Appl. No. 12/024,079, filed Jan. 31, 2008.

* cited by examiner

*Primary Examiner* — Kambiz Zand
*Assistant Examiner* — Michael Guirguis
(74) *Attorney, Agent, or Firm* — Advantedge Law Group

(57) ABSTRACT

A computer-implemented method for remediation of a computing device attempting to access a network. The method may include detecting that the computing device is attempting to access the network. The method may also include determining that the computing device does not comply with a network-access-control policy of the network. The method may include using a virtualization layer to bring the computing device into compliance with the network-access-control policy. The method may include permitting the computing device to access the network after the computing device is brought into compliance with the network-access-control policy. Various other methods, systems, and computer-readable media are also disclosed.

20 Claims, 10 Drawing Sheets

METHODS AND SYSTEMS FOR COMPUTING DEVICE REMEDIATION

CROSS REFERENCES TO RELATED APPLICATIONS

This application is related to U.S. Pat. No. 7,162,724 filed 11 Jun. 2003 and titled "Layered Computing Systems and Methods," U.S. Pat. No. 7,117,495 filed 11 Jun. 2003 and titled "Systems and Methods for the Creation of Software Packages Using Layered Systems," U.S. Pat. No. 7,165,260 filed 11 Jun. 2003 and titled "Layered Computing Systems and Methods for Insecure Environments," U.S. patent application Ser. No. 12/057,919 filed 28 Mar. 2008 and titled "Methods and Systems for Inserting Software Applications into Images," and U.S. patent application Ser. No. 10/683,564 filed on 10 Oct. 2003 and titled "Method and System for Scanning Network Devices," the disclosures of each of which are incorporated, in their entirety, by this reference.

BACKGROUND

The managed state of an organization's individual endpoints may play a critical role in the overall security and availability of its IT infrastructure and related business operations. A new wave of sophisticated crimeware not only targets specific companies, but it also targets desktops and laptops as backdoor entryways into those enterprises' business operations and valuable resources. To safeguard themselves against these targeted threats, organizations may attempt to ensure that each endpoint continually complies with corporate security and configuration management policies. Failure to guarantee endpoint policy compliance may leave organizations vulnerable to a wide array of threats, including the proliferation of malicious code throughout the enterprise, disruption of business-critical servers, increased IT recovery and management costs, exposure of confidential information, damage to corporate brand, and regulatory fines due to non-compliance.

Network access control may enable organizations to ensure the proper configuration and security state of user endpoints—including those of onsite employees, remote employees, guests, contractors, and temporary workers—before they are allowed to access resources on the corporate network. Some network access control solutions may discover and evaluate endpoint compliance status, provision the appropriate network access, and provide remediation capabilities to ensure that endpoint security policies and standards are met.

Common remediation tasks may include installing security software, installing updates, and changing security settings on an endpoint computer. When the computer belongs to the organization that owns the data network, performing remediation on the computer typically does not give rise to ownership and/or legal issues. However, when the computer is the property of someone else (e.g., a business partner or customer), installing, updating, or modifying software may conflict with the foreign computer owner's own security policies and may expose the organization making the changes to legal liability. Thus, traditional remediation technologies may not be ideal for remediation of foreign devices (and other devices) attempting to connect to a network.

SUMMARY

Embodiments of the instant disclosure may remediate computing devices attempting to access a network by using virtualization technology. Performing endpoint remediation in a virtualization layer may address one or more of the problems with traditional endpoint remediation technologies. In some embodiments, a security module on a network-access-control device may detect that a computing device is attempting to access a network. The security module may determine that the computing device does not comply with a network-access-control policy of the network. The security module may use a virtualization layer to bring the computing device into compliance with the network-access-control policy.

For example, if the network-access-control policy requires a first security software program to be installed on the computing device, the security module may create a virtualization layer and install the security software on the virtualization layer. In some embodiments, the security module may use a virtualization layer to change a security setting of a security software program on the computing device. The security module may also use a virtualization layer to update a security software program on the computing device. Once the computing device is brought into compliance with endpoint security policies, the security module may permit the computing device to access the network.

In various embodiments, the computing device may not support virtualization. In such embodiments, the security module may install virtualization software on the computing device in order to enable the use of a virtualization layer for remediation of the computing device. In other embodiments, the computing device may already support virtualization.

According to certain embodiments, the security module may undo changes to the computing device when the computing device is no longer required to comply with the network-access-control policy (e.g., when the computing device disconnects from the network). For example, the security software may remove an update to a security software program, undo a change to the security setting, and/or remove security software from the computing device by disabling and/or removing the virtualization layer.

The virtualization layer may be a software-virtualization-solution layer, such as a layer created by SYMANTEC's SOFTWARE VIRTUALIZATION SOLUTION (SVS). In some embodiments, the virtualization layer may be managed by a virtualization agent running on a virtualization-enabled microprocessor on the computing device. In other embodiments, the computing device may comprise a hard-drive cache (e.g., INTEL's TURBO MEMORY), and the virtualization layer may reside on the hard-drive cache.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
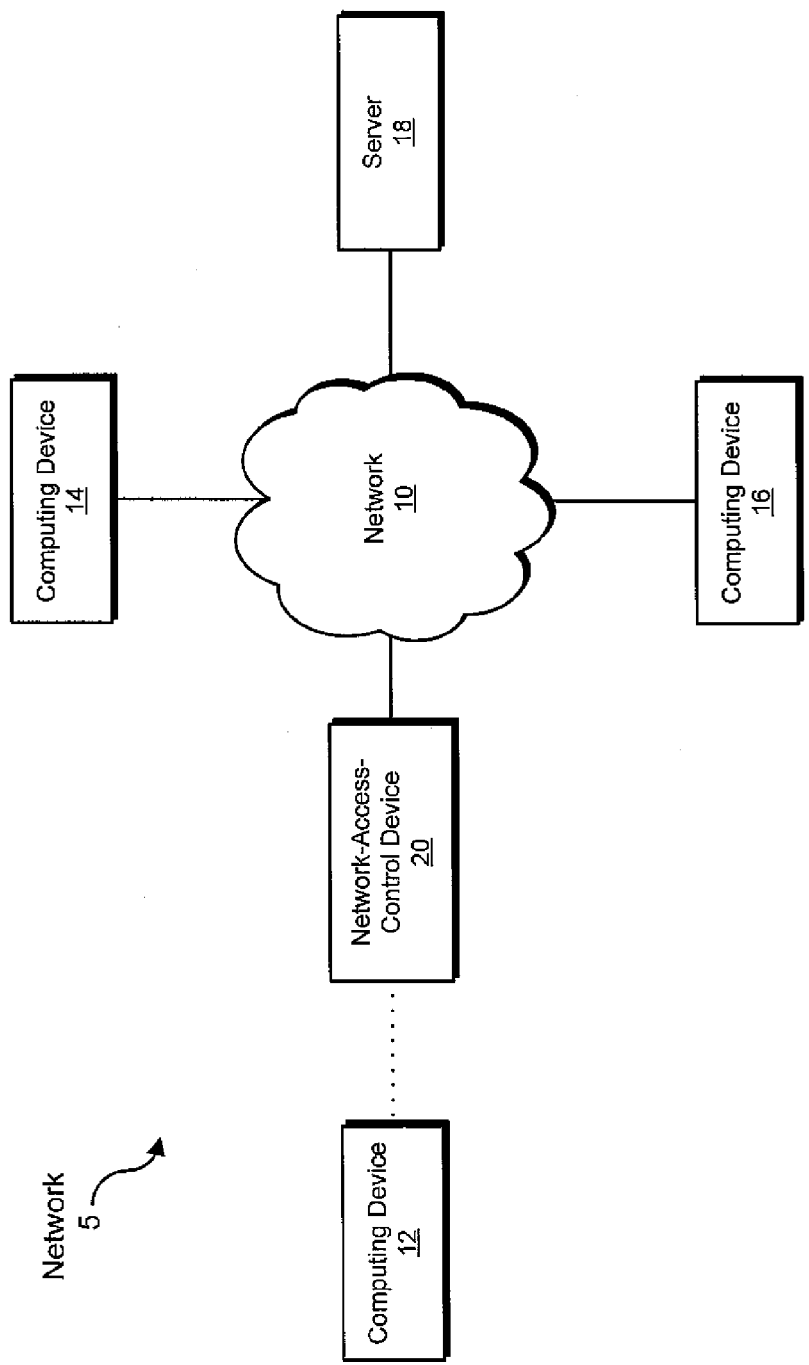
FIG. 1 is a block diagram of an exemplary network according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The following is intended to provide a detailed description of various embodiments and should not be taken to be limiting in any way. Various exemplary methods and systems for remediation of a computing device are disclosed herein. In some embodiments, a security software module may use a virtualization layer to bring the computing device into compliance with a network-access-control policy. The security module may prevent the computing device from accessing the network until after the computing device is brought into compliance with the network-access-control policy. After the computing device is brought into compliance with the network-access-control policy, the security module may permit the computing device to access the network.

Figure 2:
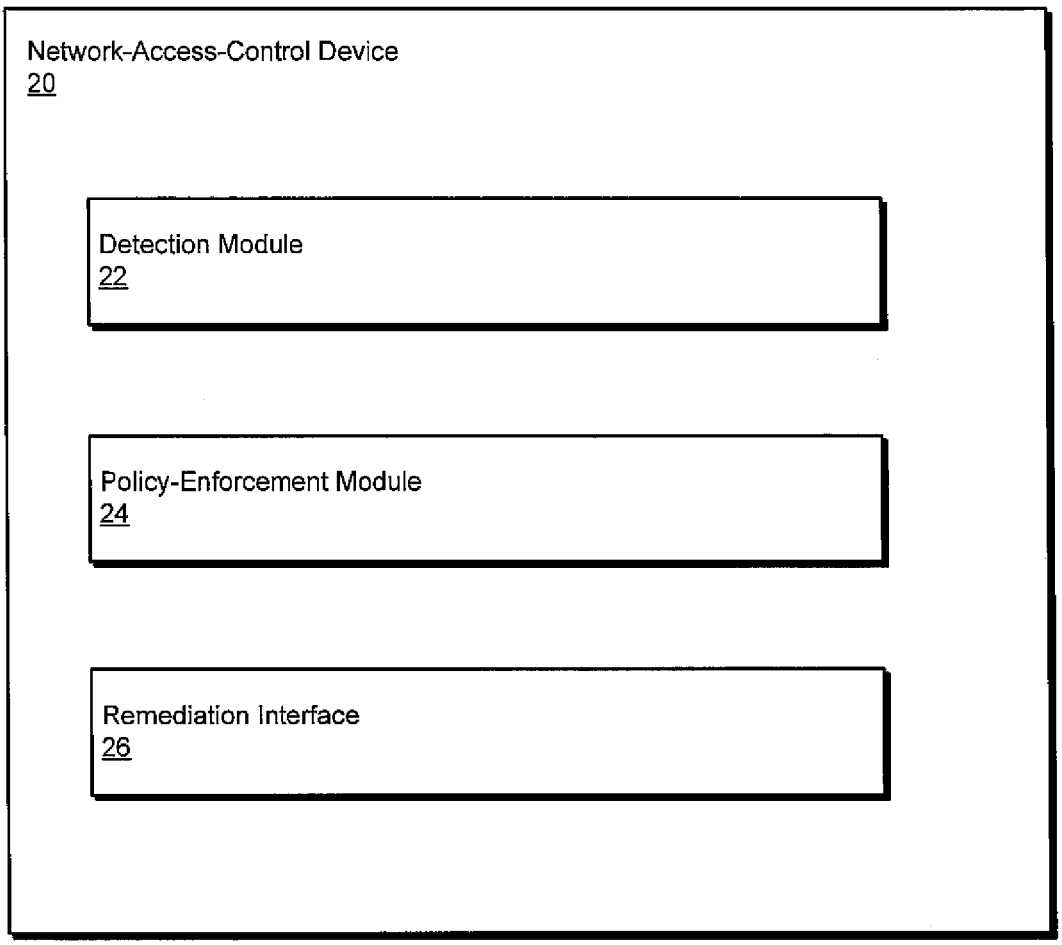
FIG. 2 is a block diagram of an exemplary network-access-control device according to certain embodiments.
Figure 3:
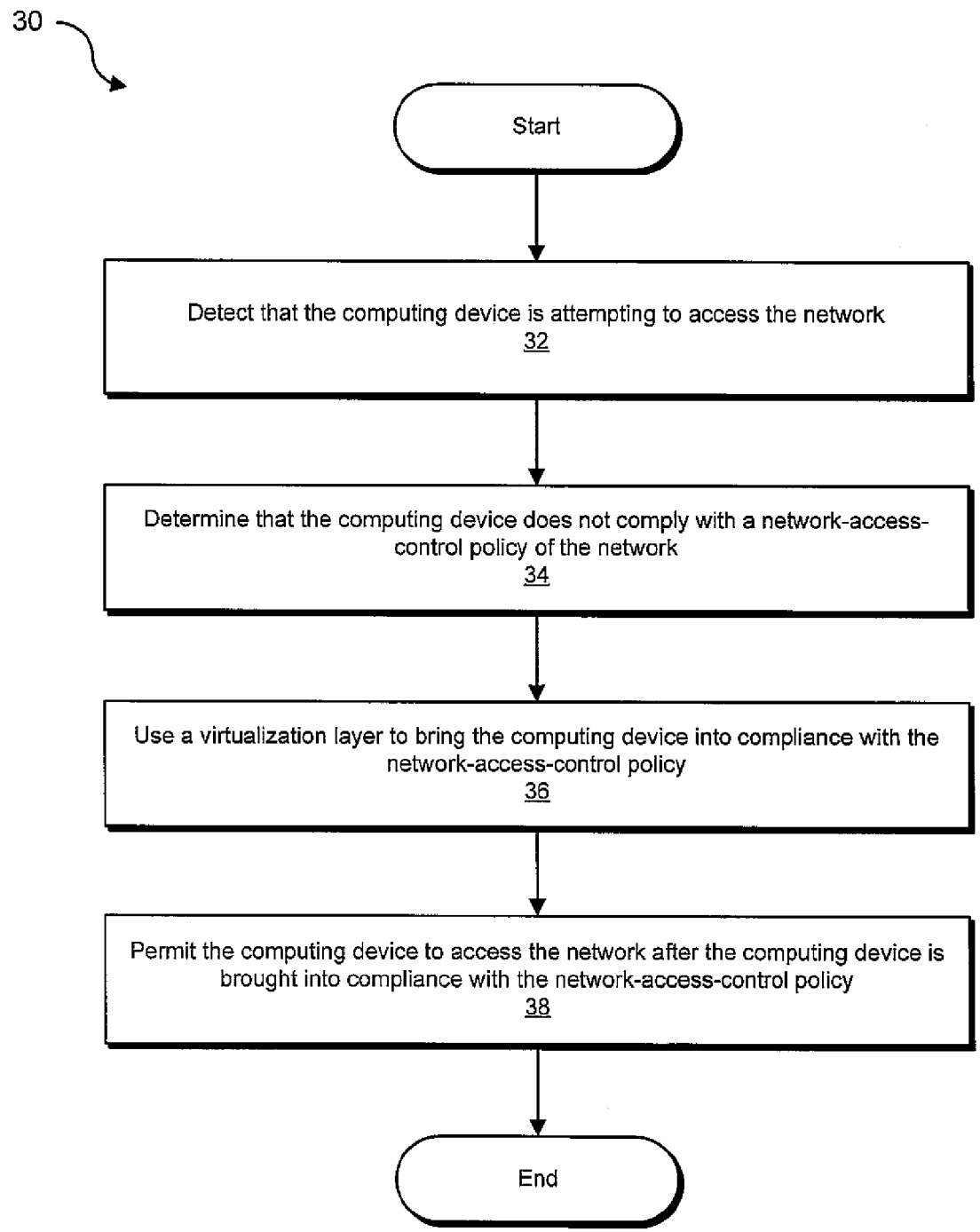
FIG. 3 is a flow diagram of an exemplary method for remediating a computing device according to certain embodiments.
Figure 4:
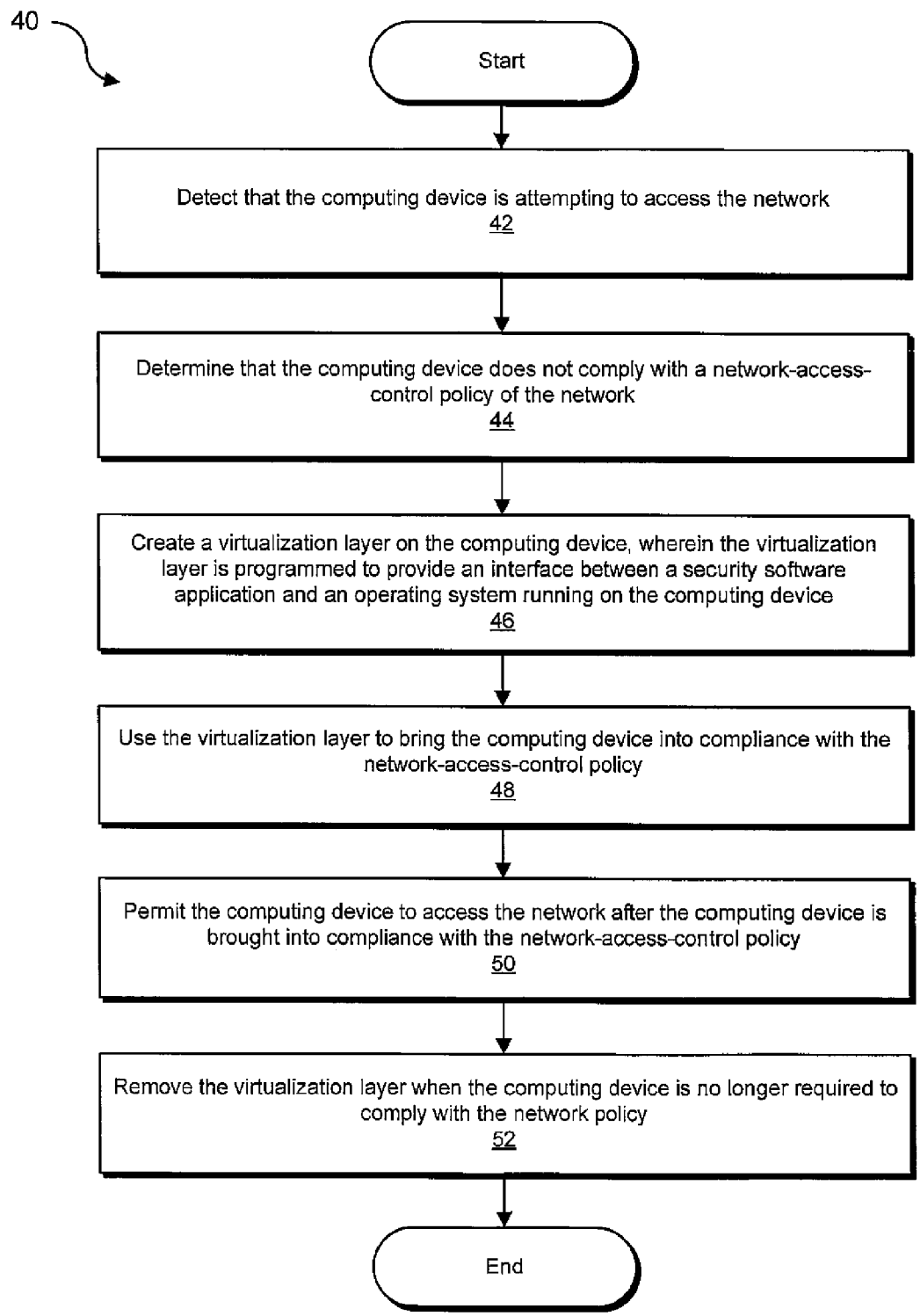
FIG. 4 is a flow diagram of another exemplary method for remediating computing devices according to certain embodiments.
Figure 9:
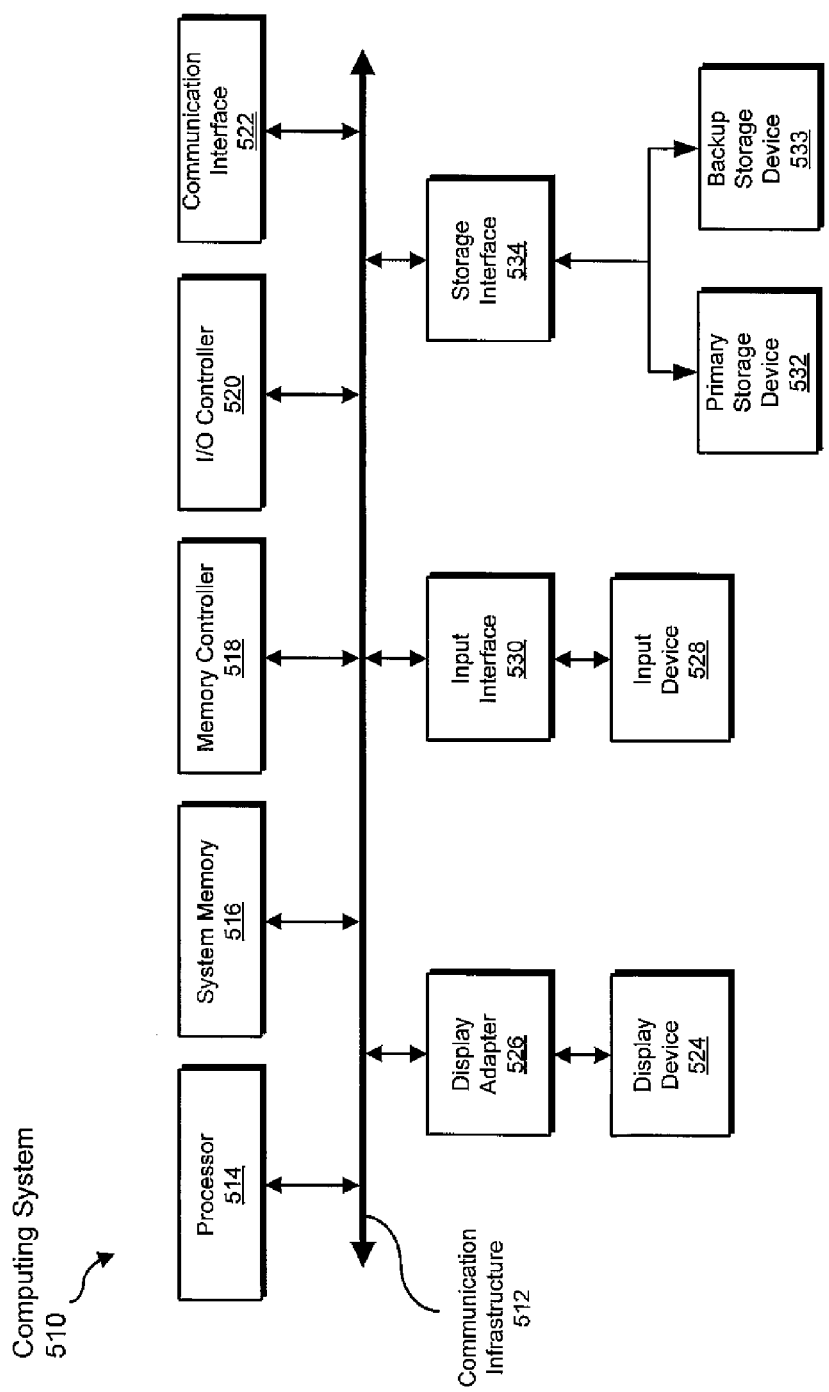
FIG. 9 is a block diagram of an exemplary computing system capable of implementing one or more of the embodiments described and/or illustrated herein.
Figure 10:
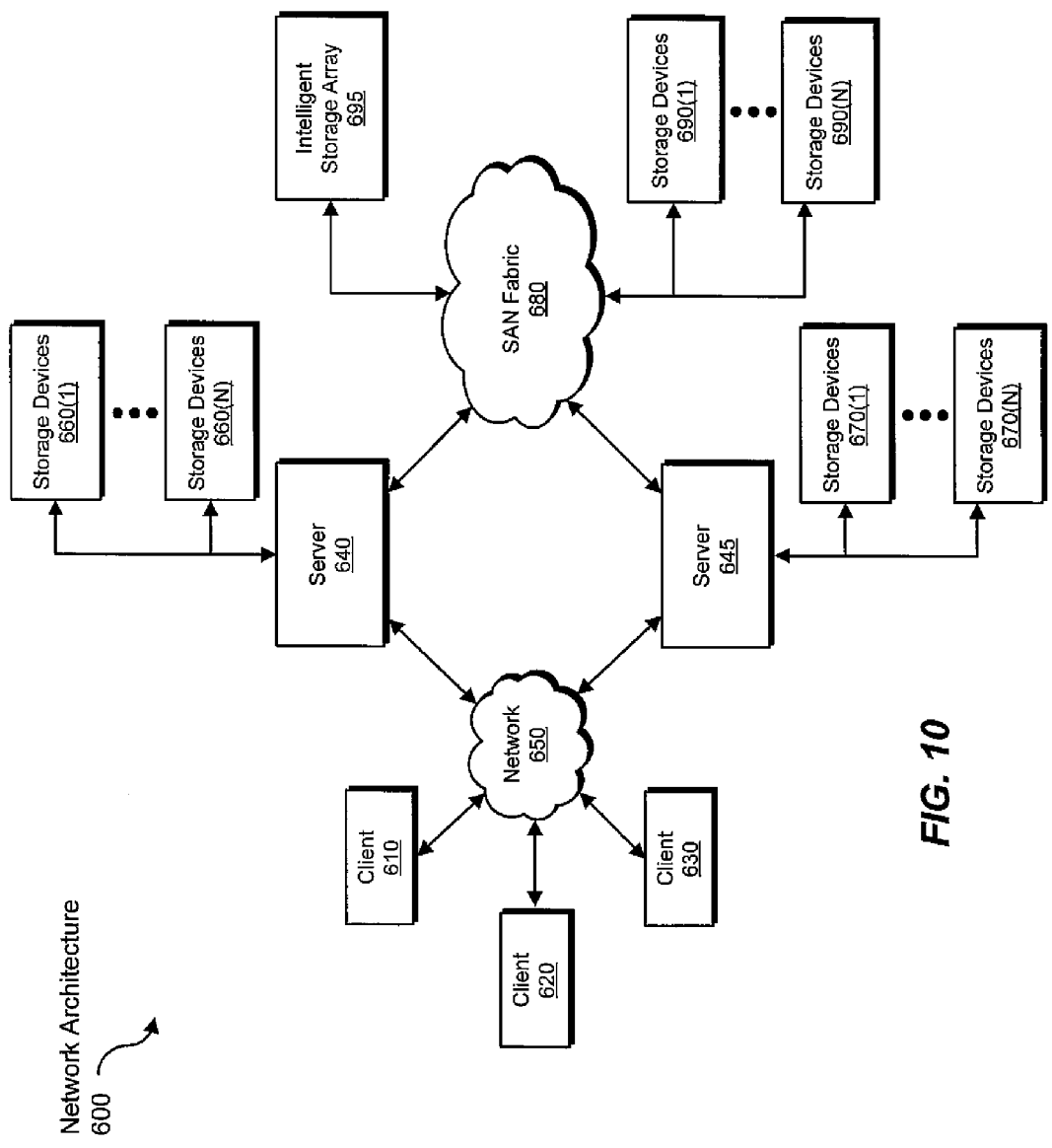
FIG. 10 is a block diagram of an exemplary computing network capable of implementing one or more of the embodiments described and/or illustrated herein.

FIG. 1 shows an exemplary network with a network-access-control device capable of implementing embodiments of the instant disclosure. FIG. 2 is a block diagram of the network-access-control device illustrated in FIG. 1. FIGS. 3 and 4 are flow diagrams of exemplary methods for remediation of computing devices according to certain embodiments. FIGS. 5-8 provide an overview of how various embodiments of virtualization technology may be implemented on a computing system. Finally, FIGS. 9 and 10 show an exemplary computing system and network capable of implementing embodiments disclosed herein.

FIG. 1 shows a network 5 with computing devices 12, 14, and 16. Network 5 also includes a network-access-control device 20 and a server 18. Computing device 16, server 18, computing device 14, and network-access-control device 20 may communicate through network 10. Network 10 may be the Internet, a wide area network, a local area network, a storage area network, or any other suitable network or network configuration. For example, network 10 may be a data network of an enterprise, and computing device 14, computing device 16, and server 18 may be enterprise resources that are permanently connected to network 10.

Computing device 12 may be a foreign computing device (e.g., a device that is not owned or controlled by the enterprise that controls network 10). Computing device 12 may attempt to access network 10 through an access point, such as network-access-control device 20. Computing device 12 may be a desktop computer, a laptop computer, a hand-held computer, or any other suitable computing device. Network-access-control device 20 may detect that computing device 12 is attempting to access network 10. Network-access-control device 20 may scan computing device 12 to determine whether computing device 12 complies with network-access-control policies of network 10.

In some embodiments, network-access-control device 20 may scan computing device 12 by using a remote scanning technique, such as the one of the remote scanning techniques described in U.S. patent application Ser. No. 10/683,564. Network-access-control device 20 may also implement various other technologies to determine whether computing device 12 complies with network-access-control policies of network 10. If computing device 12 complies with the network-access-control policies of network 10, network-access-control device 20 may allow computing device 12 to access one or more resources on network 10. However, if computing device 12 does not comply with the network-access-control policies of network 10, network-access-control device 20 may prevent computing device 12 from accessing network 10 and may attempt to remediate computing device 12.

Network-access-control device 20 may use a virtualization layer to bring computing device 12 into compliance with the network-access-control policy. Software virtualization solutions may use software (e.g., file system filter drivers) to isolate applications, application data, and application settings within a segregated folder hierarchy referred to as a "layer" or a "virtualization layer." One advantage of using virtualization for remediation is that the virtualization layer may be isolated, and when it is removed, it may leave behind no trace. Thus, remediation through virtualization may ensure that the computing device will be in a state identical to its state prior to the layer being delivered to the machine. Remediation through virtualization may be particularly useful for temporary remediation of foreign devices connecting to a network.

To implement remediation through a virtualization layer, network-access-control device 20 may create or install a layer on computing device 12 on which the remediation may be performed. In some embodiments, network-access-control device 20 may direct virtualization software on computing device 12 to create a new virtualization layer for use in the remediation. Network-access-control device 20 may then install a security application on the layer. In other embodiments, network-access-control device 20 may create a setting on the layer that changes a setting of an application that is already on computing device 12. In some embodiments, network-access-control device 20 may install an update for an application on the layer. Network-access-control device 20 may also perform any other suitable remediation function by using a virtualization layer.

FIG. 2 shows a block diagram of network-access-control device 20. Network-access-control device 20 may include a detection module 22, a policy-enforcement module 24, and a remediation interface 26. Network-access-control device 20 may also comprise various other software and hardware components not shown in FIG. 2.

Detection module 22 may be any module, application, or other computer-executable code capable of detecting that a computing device is attempting to access a network. Policy-enforcement module 24 may be any module, application, or other computer-executable code capable of determining that the computing device does not comply with a network-access-control policy of the network. Remediation interface 26 may be any module, application, or other computer-executable code capable of using a virtualization layer to bring the computing device into compliance with the network-access-control policy.

Network-access-control device 20 may be a network-access-control enabled switch, a network-access-control enabled router, or any other security endpoint device of a network. Various other types of network devices may also provide all or a portion of the functionality of network-access-control device 20. Detection module 22, policy-enforcement module 24, and/or remediation interface 26 may be native features of network-access-control device 20. In other embodiments, detection module 22, policy-enforcement module 24, and/or interface 26 may be software solutions that can be installed on a network-access-control device or any other suitable computing device.

In some embodiments, policy-enforcement module 24 may be programmed to prevent a computing device from accessing the network while the computing device is not in compliance with the network-access-control policy. Policy-enforcement module 24 may also be programmed to permit the computing device to access the network after the computing device is brought into compliance with the network-access-control policy.

Remediation interface 26 may be programmed to determine whether a foreign computing device supports virtualization and may install virtualization software on the computing device if the computing device does not support virtualization. A device may support virtualization if the device has layering software and/or hardware that supports virtualization. For example, SYMANTEC's SVS software may be installed on the foreign device.

FIG. 3 is a flow diagram of a method 30 for remediation of a computing device attempting to access a network. One or more of the steps in method 30 may be performed by a security software program. Such a security software program may provide the functionality of detection module 22, policy-enforcement module 24, and/or remediation interface 26 shown in FIG. 2.

The security software may detect that the computing device is attempting to access the network (step 32). For example, the security software may detect that a computing device is attempting to access the network when the security software receives a request to access the network (or to access a network resource) from the computing device. The security software may determine that the computing device does not comply with a network-access-control policy of the network (step 34). The security software may scan the computing device to determine whether the computing device complies with the network-access-control policy of the network. The security software may also query the computing device about whether the computing device complies with the network-access-control policies of the network.

In some embodiments, the security software may determine whether the computing device complies with a single network-access-control policy of the network. In other embodiments, the security software may check whether the computing device complies with two or more network-access-control policies of the network. The security software may typically require the computing device to comply with every security policy of a network before allowing the computing device to access the network.

Generally, a network-access-control policy may be a policy that defines the one or more requirements for accessing a network. For example, a network-access-control policy may require a particular antivirus software application (or a particular type of antivirus software application) to be installed on the computing device. The network-access-control policy may also be a policy that requires the computing device to include any other application, security patch, software plug-in, or other computer-executable code.

In some embodiments, the network-access-control policy may be a policy that requires a security software program already on the computing device to have certain settings. For example, the network-access-control policy may require an antivirus program on the computing device to have auto-update enabled. The network-access-control policy may also require a firewall of the computing device to be set to its highest level of protection. The network-access-control policy may also require software installed on the computing device to have various other settings.

In some embodiments, the network-access-control policy may be a policy that requires a particular update to be installed on the computing device. For example, the network-access-control policy may require that a service pack for an operating system be installed on the computing device before the computing device is allowed to access the network. The network-access-control policy may also require various other types of updates for various other software programs before allowing the computing device to access the network.

The security software may use a virtualization layer to bring the computing device into compliance with the network-access-control policy (step 36). For example, if the network-access-control policy requires an antivirus program to be installed on the computing device, the security module may install the anti-virus program on the virtualization layer. As part of installing the anti-virus program, the security module may also create or install the virtualization layer, or may direct the computing device to create the virtualization layer.

When the computing device disconnects from the network, or when compliance with the network-access-control policy is no longer required for any other reason, the security module may remove the security software from the computing device. The security module may completely remove the security software from the computing device by deleting the layer created for the security software. In other embodiments, the security software may be effectively removed from the device (e.g., made inaccessible) by disabling the layer.

In some embodiments, using the virtualization layer to bring the computing device into compliance with network policies may comprise using the virtualization layer to change a security setting of a security software program on the computing device. The security setting may be a registry setting, an option in the security software, or any other setting for the security software. The virtualization layer may provide settings for the security software that override the stored settings for the security software as long as the virtualization layer is enabled. In other words, the software application may use the settings on the virtualization layer, rather than the original underlying settings on the computing device, to govern the control of the security software. The security module may undo the change to the security setting when the computing device disconnects from the network or when the compliance with the network-access-control policy is no longer required for any other reason. In some embodiments, the compliance may be no longer be required when permanent changes, rather than virtual changes, are made to the device.

After the computing device is brought into compliance with the network-access-control policy, the security module may permit the computing device to access the network (step 38). The security module may allow the computing device access to the entire network, a portion of the network, a single device or resource on the network, or any other set or subset of network resources.

In some embodiments, the virtualization layer may be managed by a virtualization agent running on a virtualization-enabled microprocessor on the computing device. The process may be executed locally by a known, secure management agent running on a virtualization-enabled chip, such as an INTEL VPRO chip. In such embodiments, the computing device may not need to have additional software installed to enable virtualization.

In other embodiments, a computing device attempting to access a network device may have storage that may be used to contain layer data. For example, some computing devices may contain a hard drive cache, such as INTEL's TURBO MEMORY. In such embodiments, remediation data may be stored on the cache and layered over files and registry of the running operating system. Using a hard drive cache to store virtualization data may minimize the footprint of the remediation activity on the hard drive of the foreign device and may reduce the risk of unintentionally leaving behind permanent changes to the foreign device due to a failure of a remediation removal process. Using a hard drive cache to store virtualization data may also allow out-of-band distribution of virtual packages.

FIG. 4 shows a computer-implemented method 40 for remediation of a computing device attempting to access a network. As shown in FIG. 4, a security module may detect that the computing device is attempting to access the network (step 42). The security module may determine that the computing device does not comply with the network-access-control policy of the network (step 44).

The security module may determine whether the computing device comprises virtualization technology. For example, the security module may look for a fslx.sys file system filter driver on the computing device. If the computing device is not already enabled with virtualization technology, the security module may install, or may direct the computing device to install, virtualization software on the computing device.

The security module may create a virtualization layer on the computing device. The virtualization layer may be programmed to provide an interface between a security software application and an operating system running on the computing device. The security module may use the virtualization layer to bring the computing device into compliance with the network-access-control policy (step 48). In some embodiments, a virtualization layer may be implemented by streaming remediation data to virtualization technology on the computing device. Such embodiments may help minimize the impact of remediation on the computing device.

The security module may permit the computing device to access the network once the computing device is brought into compliance with the network-access-control policy (step 50). Finally, the security module may remove the virtualization layer from the computing device when the computing device is no longer required to comply with the network policy (step 52).

Figure 5:
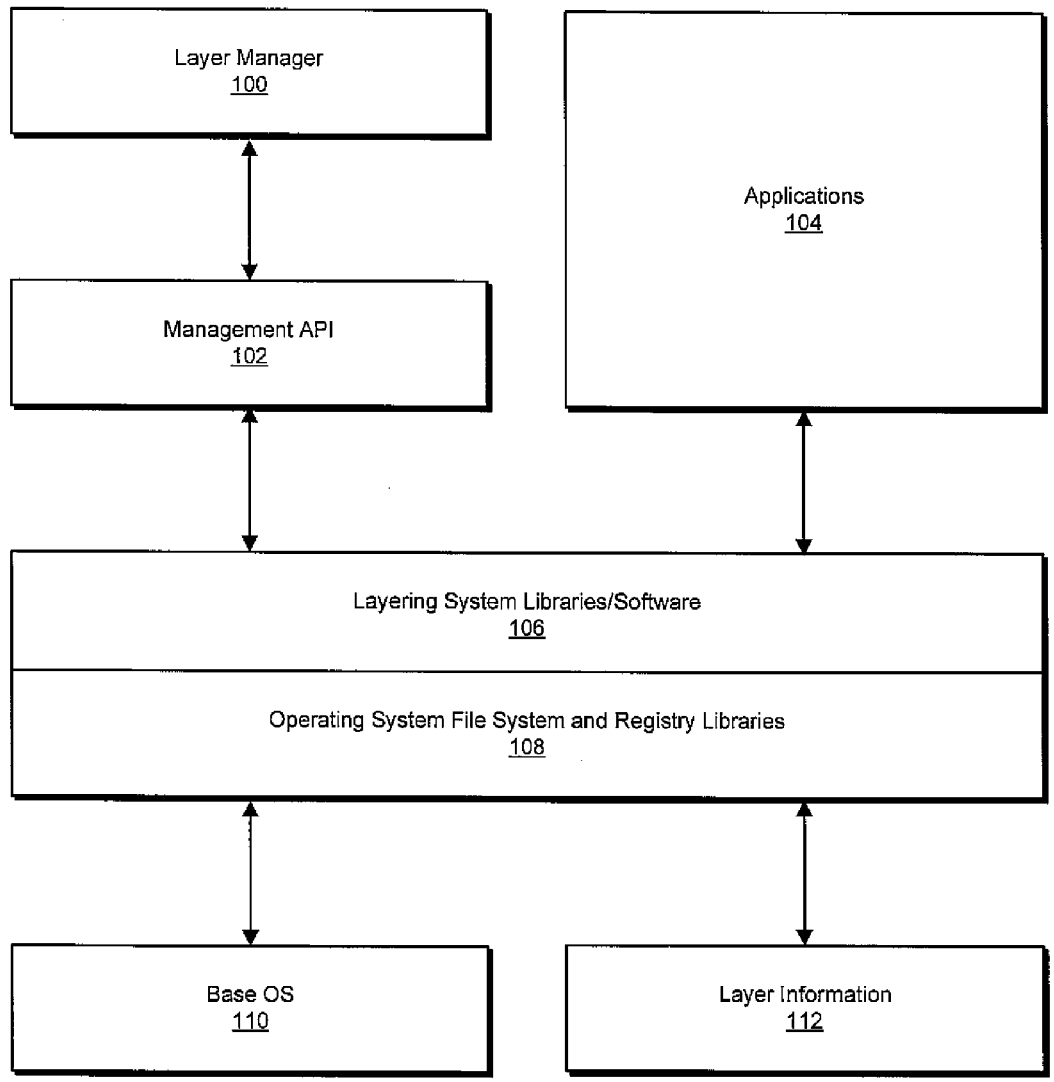
FIG. 5 is a block diagram of exemplary components of a virtualization system on a computing device at a conceptual level according to certain embodiments.

FIG. 5 shows a computing device with a virtualization layer at a conceptual level. A base operating system 110 may form a platform with which applications may be executed and from which files may be accessed in file systems. This operating system may include registry settings that may be globally available to applications for reading and writing. The computing device may include libraries 108 for executing functions of the operating system, including operating system files and registries, and other operating system functions. Layering system libraries and software 106 may be tied into libraries 108. Layering system libraries and software 106 may interpret file system and registry accesses from applications 104.

Layering system software 106 may determine whether the access should be permitted to continue to the base operating system 110, or should be redirected to layer information 112. Layer information 112 may be the information relating to the contents of files and registry settings. Layer manager application 100 may control configuration of the layering system software 106 through a management application-programming interface (API 102). A computing device enabled with layering technology may comprise layering a layer manager 100, a management API 102, and layering system libraries and software 106. Applications 104 may be remediation software and/or settings for the computing device.

Figure 6:
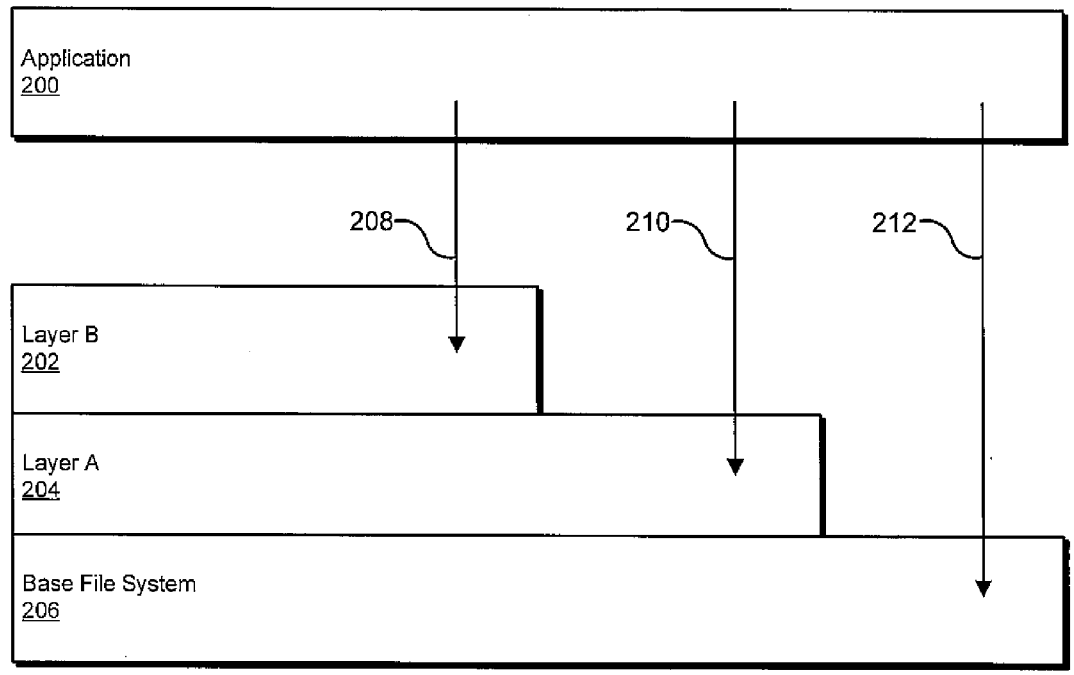
FIG. 6 is a block diagram of an exemplary operation of a virtualization system according to certain embodiments.

FIG. 6 shows the operation of a computing system with a virtualization layer at a conceptual level. A computer system may include a base file system 206, an application 200, and a virtualization system comprising a layer B 202 and a layer A 204. Layer B may have priority over layer A, which in turn may have priority over a base file system.

In some embodiments, a computing device may already have a virtualization layer in place before network access remediation begins. For example, layer A may be a virtualization layer that stores settings for application 200, which may be a security software program. In order to remediate the computing device, a remediation interface may change the settings on layer A. In other embodiments, an additional layer, layer B, may be created. In such embodiments, layer B may comprise the remediation data (e.g., software and settings).

File access requests 208, 210, and 212 show how access to virtualization layers may be implemented. A first file access request 208 may be made by application 200. The virtualization system may first search in layer B 202 for the requested file. Layer B 202 may include an entry for file access request 208, and corresponding file in layer B 202 may be opened and returned to the application. Since layer B 202 has priority over layer A 204 and base file system 206, even if layer A 204 and base file system 206 have entries that correspond to file access request 208, the virtualization system may return the entry from layer B 202.

Application 200 may make another file access request 210. The virtualization system may not find corresponding entry in layer B 202, but may find an entry in layer A 204. A third file access request 212 may not have a corresponding entry in layer B 202 or layer A 204, and the virtualization system may therefore return an entry from base file system 206.

Figure 7:
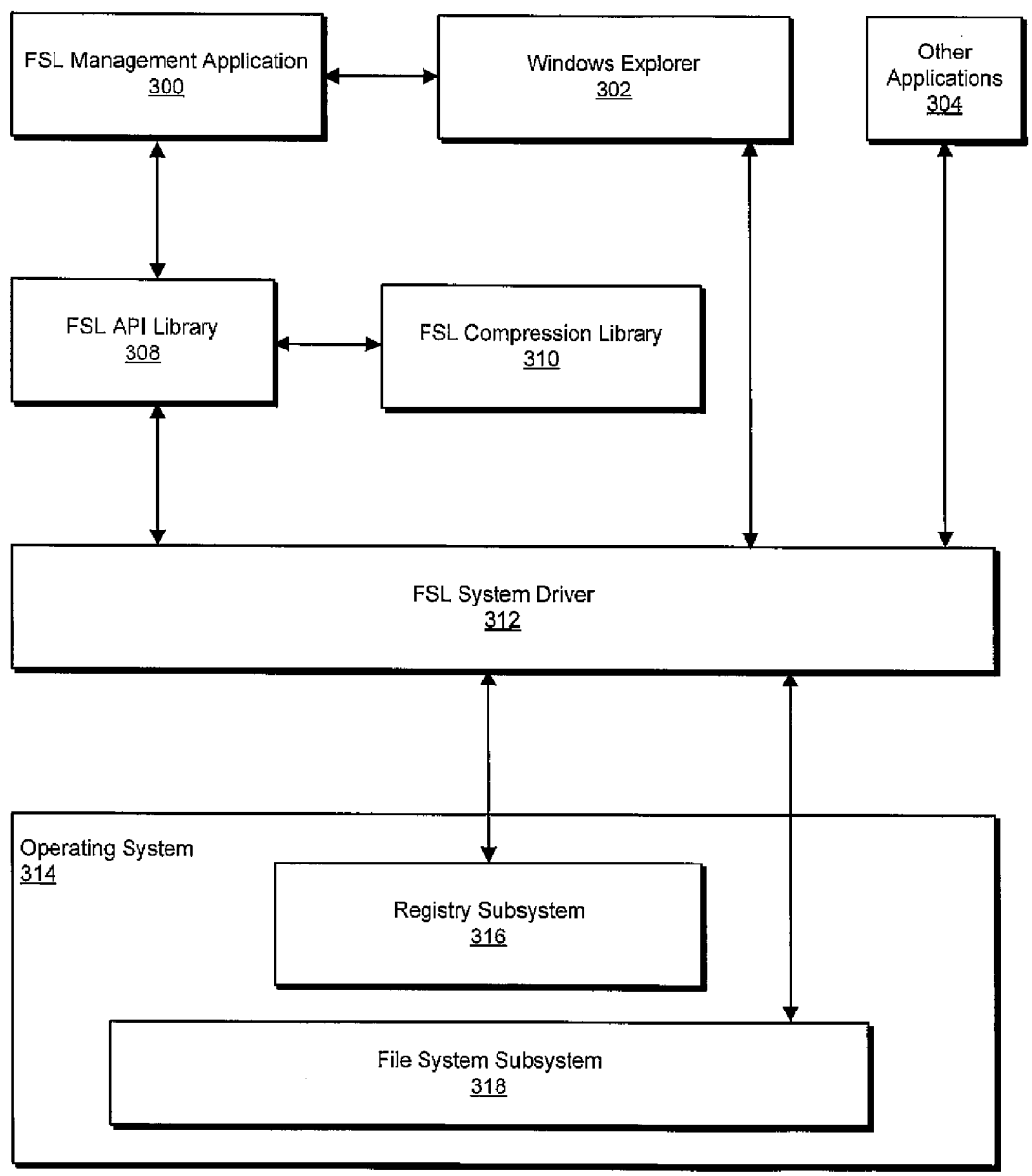
FIG. 7 is a block diagram of a computing system that supports virtualization according to certain embodiments.

FIG. 7 shows an example of a computing device with a virtualization layer for remediation installed. The system may include an operating system 314. Operating system 314 may comprise subsystems for handling a registry 316 and a file system subsystem 318. The system driver 312 may be installed on operating system 314 and may have first processing priority for registry and file system accesses. A management application 300 may provide an administrator with an interface to interact with system driver 312 and make changes to layers. An API library 308 may provide a convenient interface for management application 300 to interface with system driver 312.

Management application 300 may provide notices to windows explorer 302 that the content of a mounted file system have been changed. Other applications 304 may interact with the system, performing read-and-write operations to the file system and registry through system driver 312. The compression library 310 may be provided to compress layer information, especially for layer archives exported by the system.

Figure 8:
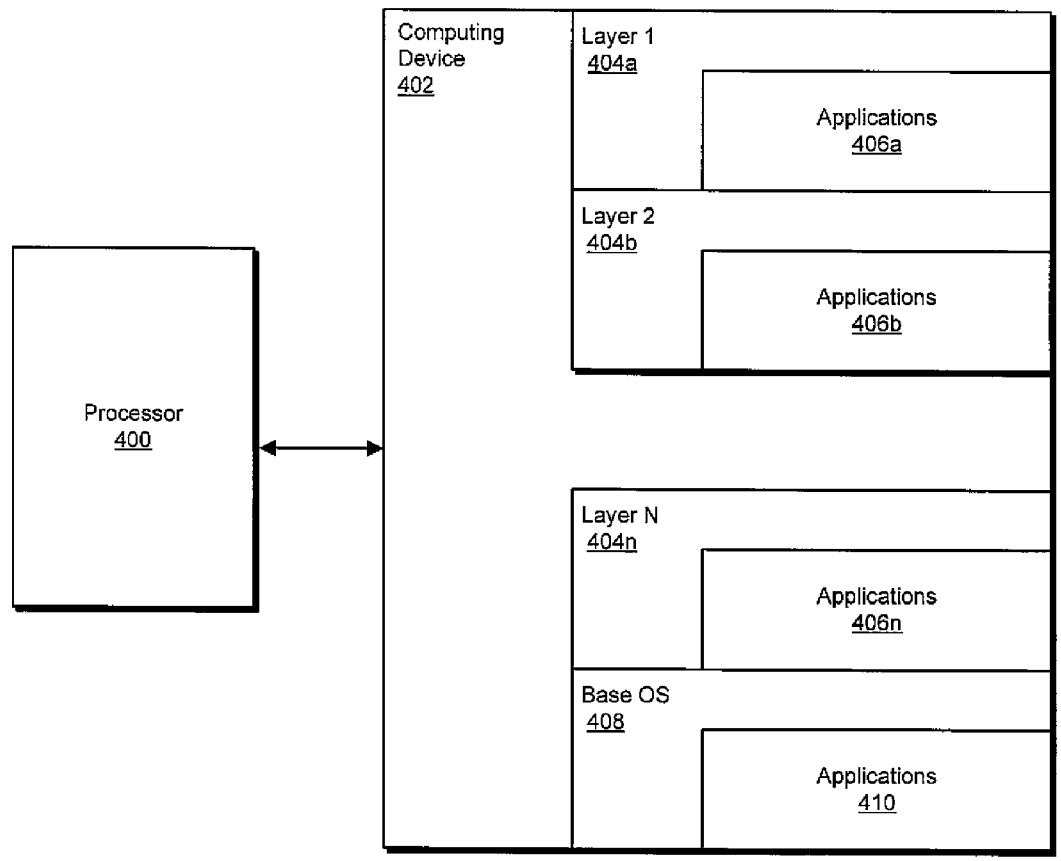
FIG. 8 is a block diagram of the organization of an exemplary computing system with virtualization according to certain embodiments.

FIG. 8 illustrates an example of virtualization layers installed on a computing device 402. Computing device 402 may contain a number of layers 404a-n. Applications 406a-n may be installed on layers 404a-n, respectively. As referred to herein, a layer (or virtualization layer) may refer to a set of file systems and registry changes that may be managed by layering system software. In some embodiments, a layer may contain changes to one of the file systems but may not contain registry changes.

A layer may isolate an application from a base file system and may include files in a directory structure of the applications installation. When the layer is inserted (or enabled) in an image, the application files and directories may be shadowed or overlaid on the regular operating file system. Shared libraries (such as DLLs), system accessible configurations (such as registry entries), and version control may be managed by a layering subsystem.

Though each layer may be a separate and individual entity within an image, the application files, data, and system-accessible configuration may be presented as though they resided in their respective ordinary locations. Thus, an application stored in a layer may appear to the operating system of a deployed image as if it had been installed using traditional installation techniques.

As previously noted, using virtualization layers for computing device remediation may have numerous advantages. For example, remediation applications inserted into a layer may be safely and completely uninstalled or removed from the image by removing the layer from the image. This provides an advantage of being able to completely remove the remediation after compliance with the network-access-control policy is no longer required.

FIG. 9 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the detecting, determining, using, permitting, installing, removing, undoing, updating, and/or creating steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (e.g., system memory 516) and a non-volatile storage device (e.g., primary storage device 532, as described in detail below).

In certain embodiments, exemplary computing system 510 may also comprise one or more components or elements in addition to processor 514 and system memory 516. For example, as illustrated in FIG. 9, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as detecting, determining, using, permitting, installing, removing, undoing, updating, and/or creating.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for detecting, determining, using, permitting, installing, removing, undoing, updating, and/or creating. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network or a wireless IEEE 502.11 network), a personal area network (such as a BLUETOOTH or IEEE Standard 502.15.1-2002 network), a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the detecting, determining, using, permitting, installing, removing, undoing, updating, and/or creating steps disclosed herein. Communication interface 522 may also be used to perform and/or be a means for performing other steps and features set forth in the instant disclosure.

As illustrated in FIG. 9, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 9, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the detecting, determining, using, permitting, installing, removing, undoing, updating, and/or creating steps disclosed herein. Input device 528 may also be used to perform and/or be a means for performing other steps and features set forth in the instant disclosure.

As illustrated in FIG. 9, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Storage devices 532 and 533 may also be used, for example, to perform and/or be a means for performing, either alone or in combination with other elements, one or more of the detecting, determining, using, permitting, installing, removing, undoing, updating, and/or creating steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 9 need not be present to practice the embodiments described and/or illustrated herein. The devices and subsystems referenced above may also be interconnected in different ways from that shown in FIG. 9. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 10 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 9. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the Internet.

As illustrated in FIG. 10, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 9, a communication interface, such as communication interface 522 in FIG. 9, may be used to provide connectivity between each client system 610, 620, and 630 and network 650. Client systems 610, 620, and 630 may be able to access information on server 640 or 645 by using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the detecting, determining, using, permitting, installing, removing, undoing, updating, and/or creating steps disclosed herein. Network architecture 600 may also be used to perform and/or be a means for performing other steps and features set forth in the instant disclosure.

As detailed above, client system 610 and/or one or more of the components of network architecture 600 may perform and/or be a means for performing, either alone or in combination with other elements, one or more steps of the exemplary methods described and/or illustrated herein. For example, client system 610 and/or one or more of the components of network architecture 600 may perform and/or be a means for performing a computer-implemented method for remediation of a computing device attempting to access a network. In some embodiments, the computer-implemented method may comprise detecting that the computing device is attempting to access the network and determining that the computing device does not comply with the network-access-control policy of the network. The method may further comprise using a virtualization layer to bring the computing device into compliance with the network-access-control policy and permitting the computing device to access the network after the computing device has been brought into compliance with the network-access-control policy.

According to at least one embodiment, the method may further comprise determining whether the computing device supports virtualization and, if the computing device does not support virtualization, installing virtualization software on the computing device. In at least one embodiment, the virtualization layer may be a software-virtualization-solution layer, such as SYMANTEC's SYS technology. According to at least one embodiment, determining whether the computing device supports virtualization may comprise determining whether the computing system may comprise a driver that controls interactions between an operating system on a computing device and applications running on the virtualization layer.

According to certain embodiments, the network-access-control policy may require a first security software program to be installed on the computing device. In some embodiments, using the virtualization layer to bring the computing device into compliance may comprise installing the security software on the virtualization layer. The method may also comprise removing the security software from the computing device when the computing device disconnects from the network.

According to certain embodiments, the method may comprise using the virtualization layer to change a security setting of a security software program on the computing device. In some embodiments, when the computing device disconnects from the network or compliance is otherwise no longer required, the method may comprise undoing the change to the security setting.

According to at least one embodiment, using the virtualization layer to bring the computing device into compliance may comprise updating a security software program on the computing device. When the computing device disconnects from the network, the security software program may be removed.

In at least one embodiment, the virtualization layer may be managed by a virtualization agent running on a virtualization-enabled microprocessor on the computing device. In some embodiments, the computing device may comprise a hard-drive cache and the virtualization layer may reside on the hard-drive cache.

In some embodiments, a virtualization layer may be programmed to provide an interface between a security software application and an operating system running on the computing device. According to at least one embodiment, the method may further comprise undoing changes to the computing device when the computing device is no longer required to comply with the network access policy.

In certain embodiments, a system for controlling access to a network may comprise a detection module programmed to detect that a computing device is attempting to access the network. The system may also comprise a policy-enforcement module programmed to determine that the computing device does not comply with a network-access-control policy of the network. The system may further comprise a remediation interface programmed to use a virtualization layer to bring the computing device into compliance with the network-access-control policy.

According to various embodiments, the system may comprise a network-access-control enabled switch. The network-access-control enabled switch may comprise the detection module, the policy enforcement module, and the remediation interface. According to other embodiments, the system may further comprise a network-access-control enabled router. The network-access-control enabled router may comprise the detection module, the policy enforcement module, and the remediation interface.

In at least one embodiment, the policy enforcement module may be programmed to prevent the computing device from accessing the network while the computing device does not comply with the network-access-control policy. In some embodiments, the policy enforcement module may be programmed to permit the computing device to access the network after the computing device is brought into compliance with the network-access-control policy. According to various embodiments, the remediation interface may be programmed to determine whether the computing device supports virtualization. The remediation interface may also be programmed to install virtualization software on the computing device if the computing device does not support virtualization.

According to certain embodiments, a computer-implemented method for remediation of a computing device attempting to access a network may comprise detecting that the computing device is attempting to access the network. The method may also comprise determining that the computing device does not comply with a network-access-control policy of the network. The method may further comprise creating a virtualization layer on the computing device. The virtualization layer may be programmed to provide an interface between security software application and an operating system running on the computing device. The method may further comprise using the virtualization layer to bring the computing device into compliance with the network-access-control policy. The method may further comprise permitting the computing device to access the network after the computing device is brought into compliance with the network-access-control policy. The method may further comprise removing the virtualization layer when the computing device is no longer required to comply with the network-access-control policy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for remediation of a computing device attempting to access a network, the computer-implemented method comprising:
    detecting that the computing device is attempting to access the network, wherein the computing device comprises a base operating system that includes a base file system and registry;
    determining that the computing device does not comply with a network-access-control policy of the network, wherein the computing device is a foreign device that is not controlled by an entity that controls the network;
    determining that the computing device does not support virtualization because the computing device does not comprise virtualization layering software;
    in response to determining that the computing device does not support virtualization:
        installing virtualization layering software on the computing device, the virtualization laying software being programmed to determine whether access requests to the base operating system are permitted to continue to the base operating system or should be redirected to the virtualization layer;
        installing the virtualization layer on the computing device;
    using the virtualization layer to bring the computing device into compliance with the network-access-control policy, wherein:
        the virtualization layer comprises file system and/or registry changes that are isolated from the base file system and/or registry;
        the file system and/or registry changes in the virtualization layer are isolated from the base file system and/or registry;
        when the virtualization layer is enabled the file system and/or registry changes are overlaid over the base file system and/or registry such that the file system and/or registry changes appear to the base operating system as if they had been installed using traditional installation techniques;

the file system and/or registry changes are inaccessible when the virtualization layer is disabled;

permitting the computing device to access the network after the computing device is brought into compliance with the network-access-control policy.

2. The computer-implemented method of claim 1, wherein:
the virtualization layering software installs the virtualization layer on the computing device by creating the virtualization layer.

3. The computer-implemented method of claim 1, wherein:
the virtualization layer is a software-virtualization-solution layer;
determining that the computing device does not support virtualization comprises determining that the computing device does not comprise a driver that controls interactions between the base operating system on the computing device and the virtualization layer.

4. The computer-implemented method of claim 1, wherein:
the network-access-control policy requires a first security software program to be installed on the computing device;
using the virtualization layer to bring the computing device into compliance comprises installing the first security software program on the virtualization layer;
the file system and/or registry changes in the virtualization layer comprise the first security software program.

5. The computer-implemented method of claim 4, further comprising:
determining that the computing device has disconnected from the network;
removing the first security software program from the computing device when the computing device disconnects from the network by disabling or deleting the virtualization layer.

6. The computer-implemented method of claim 1, wherein:
using the virtualization layer to bring the computing device into compliance comprises using the virtualization layer to change a security setting of a security software program on the computing device;
the file system and/or registry changes in the virtualization layer comprise the security setting of the security software program.

7. The computer-implemented method of claim 6, further comprising:
undoing the change to the security setting when the computing device disconnects from the network by disabling the virtualization layer.

8. The computer-implemented method of claim 1, wherein:
using the virtualization layer to bring the computing device into compliance comprises updating a security software program on the computing device by installing an update for the security software program to the virtualization layer;
the file system and/or registry changes in the virtualization layer comprise the update.

9. The computer-implemented method of claim 8, further comprising:
removing the update to the security software program when the computing device disconnects from the network by deleting the virtualization layer.

10. The computer-implemented method of claim 1, wherein:
using the virtualization layer to bring the computing device into compliance with the network-access-control policy comprises streaming remediation data to the virtualization layer software on the computing device such that the impact of remediation on the computing device is minimized.

11. The computer-implemented method of claim 1, further comprising:
determining that the file system and/or registry changes in the virtualization layer have been made permanently to the base file system and/or registry;
in response to determining that the file system and/or registry changes in the virtualization layer have been made permanently to the base file system and/or registry, deleting the virtualization layer.

12. The computer-implemented method of claim 1, further comprising:
determining that compliance with the network-access-control policy is no longer required;
in response to determining that compliance with the network-access-control policy is no longer required, undoing the file system and/or registry changes by removing and/or disabling the virtualization layer.

13. The computer-implemented method of claim 1, further comprising when the computing device no longer requires access to the network:
returning the computing device to a state that is identical to a state of the computing device prior to the virtualization layer being installed on the computing device.

14. A computing system for controlling access to a network, the system comprising:
a base operating system;
a detection module programmed to detect that a computing device is attempting to access the network;
a policy-enforcement module programmed to determine that the computing device does not comply with a network-access-control policy of the network, wherein the computing device is a foreign device that is not controlled by an entity that controls the network;
a remediation interface programmed to:
determine that the computing device does not support virtualization because the computing device does not comprise virtualization layering software;
in response to determining that the computing device does not support virtualization:
install virtualization layering software on the computing device, the virtualization laying software being programmed to determine whether access requests to the base operating system are permitted to continue to the base operating system or should be redirected to a virtualization layer;
use the virtualization layering software to install the virtualization layer on the computing device;
use the virtualization layer to bring the computing device into compliance with the network-access-control policy;
a file system filter driver that isolates the base operating system from remediation data in the virtualization layer;
at least one processor configured to execute the detection module and the policy-enforcement module.

15. The system of claim 14, further comprising:
a network-access-control enabled switch, the network-access-control enabled switch comprising the detection module, the policy-enforcement module, and the remediation interface.

16. The system of claim 14, further comprising:
a network-access-control enabled router, the network-access-control enabled router comprising the detection module, the policy-enforcement module, and the remediation interface.

17. The system of claim 14, wherein:
the policy-enforcement module is programmed to prevent the computing device from accessing the network while the computing device does not comply with the network-access-control policy;
the policy-enforcement module is programmed to permit the computing device to access the network after the computing device is brought into compliance with the network-access-control policy.

18. The system of claim 17, wherein:
the policy enforcement module is programmed to determine that compliance with the network-access-control policy is no longer required, and in response to determining that compliance with the network-access-control policy is no longer required, remove the virtualization layer such that the computing device is in a state identical to a state of the computing device prior to the virtualization layer being provided on the computing device.

19. The system of claim 14, wherein:
the remediation interface is programmed to use the virtualization layer to bring the computing device into compliance by creating a setting on the virtualization layer that changes a setting of an application that is already installed on the computing device.

20. A computer-implemented method for remediation of a computing device attempting to access a network, the computer-implemented method comprising:
detecting that the computing device is attempting to access the network;
determining that the computing device does not comply with a network-access-control policy of the network, wherein the computing device is a foreign device that is not controlled by an entity that controls the network;
determining that the computing device does not support virtualization because the computing device does not comprise virtualization layering software;
in response to determining that the computing device does not support virtualization:
installing virtualization layering software on the computing device, the virtualization laying software being programmed to determine whether access requests to the base operating system are permitted to continue to the base operating system or should be redirected to a virtualization layer, and
using the virtualization layering software to install the virtualization layer on the computing device;
using the virtualization layer to bring the computing device into compliance with the network-access-control policy;
permitting the computing device to access the network after the computing device is brought into compliance with the network-access-control policy;
removing the virtualization layer when the computing device is no longer required to comply with the network-access-control policy.

* * * * *

UNITED STATES PATENT AND TRADEMARK OFFICE
CERTIFICATE OF CORRECTION

PATENT NO. : 8,353,044 B1
APPLICATION NO. : 12/147744
DATED : January 8, 2013
INVENTOR(S) : Howard Jones et al.

It is certified that error appears in the above-identified patent and that said Letters Patent is hereby corrected as shown below:

Claim 1, at column 16, lines 49 to 54, should read:

installing virtualization layering software on the computing device, the virtualization layering software being programmed to determine whether access requests to the base operating system are permitted to continue to the base operating system or should be redirected to the virtualization layer;

Claim 14, at column 18, lines 48 to 53, should read:

install virtualization layering software on the computing device, the virtualization layering software being programmed to determine whether access requests to the base operating system are permitted to continue to the base operating system or should be redirected to a virtualization layer;

Claim 20, at column 20, lines 15 to 20, should read:

installing virtualization layering software on the computing device, the virtualization layering software being programmed to determine whether access requests to the base operating system are permitted to continue to the base operating system or should be redirected to a virtualization layer, and Signed and Sealed this
Twenty-sixth Day of March, 2013

Teresa Stanek Rea
*Acting Director of the United States Patent and Trademark Office*